(12) United States Patent
Nozaki

(10) Patent No.: US 7,916,583 B2
(45) Date of Patent: Mar. 29, 2011

(54) OPTICAL DISK REPRODUCING DEVICE HAVING AN INTERMITTENT REPRODUCING UNIT

(75) Inventor: Koji Nozaki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1104 days.

(21) Appl. No.: 11/115,413

(22) Filed: Apr. 27, 2005

(65) Prior Publication Data

US 2005/0244144 A1 Nov. 3, 2005

(30) Foreign Application Priority Data

Apr. 28, 2004 (JP) ................ P2004-132705

(51) Int. Cl.
*G11B 11/00* (2006.01)
(52) U.S. Cl. ............. 369/30.24; 369/30.26; 369/53.37
(58) Field of Classification Search ...... 369/30.1–30.17, 369/30.23, 30.24, 30.26; 386/67–70, 5
See application file for complete search history.

(56) References Cited

U.S. PATENT DOCUMENTS

| | | | | |
|---|---|---|---|---|
| 5,457,669 A | * | 10/1995 | Kim et al. ............... | 369/30.15 |
| 2002/0089901 A1 | * | 7/2002 | Morohoshi et al. ....... | 369/30.11 |
| 2004/0247286 A1 | * | 12/2004 | Takagi et al. ............ | 386/68 |
| 2005/0063670 A1 | * | 3/2005 | Arai ........................ | 386/69 |

FOREIGN PATENT DOCUMENTS

| | | |
|---|---|---|
| JP | A-06-309798 | 11/1994 |
| JP | A-2000-285589 | 10/2000 |
| JP | A-2000-339864 | 12/2000 |

* cited by examiner

*Primary Examiner* — Hoa T Nguyen
*Assistant Examiner* — Mark L Fischer
(74) *Attorney, Agent, or Firm* — Morgan, Lewis & Bockius LLP

(57) ABSTRACT

An optical disk device includes an intermittent reproducing unit to perform an intermittent reproducing process to reproduce data recorded on an optical disk in a forward or reverse direction and at specific time intervals, each removing predetermined amount of data, an intermittent reproduction start instruction unit, upon receiving an instruction to start the intermittent reproducing process, to designate an intermittent reproduction start position and an intermittent reproducing direction, and to issue an instruction, and a storage unit to store the intermittent reproduction start position as information concerning a recording position for data skipped and unreproduced during a current intermittent reproducing process, when the instruction is issued. When an instruction is received to restart the intermittent reproducing process, the intermittent reproduction start instruction unit employs the information to start the intermittent reproducing process beginning at a head of data skipped and unreproduced during a preceding intermittent reproducing process.

2 Claims, 3 Drawing Sheets

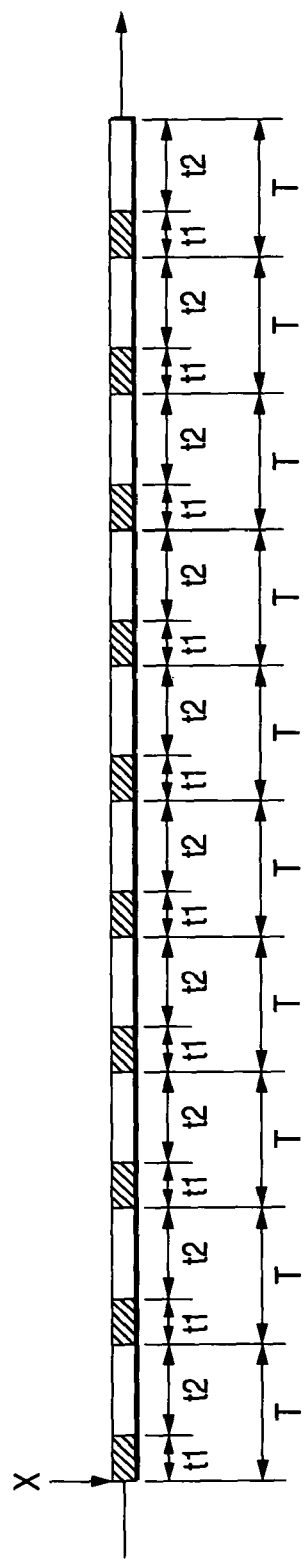
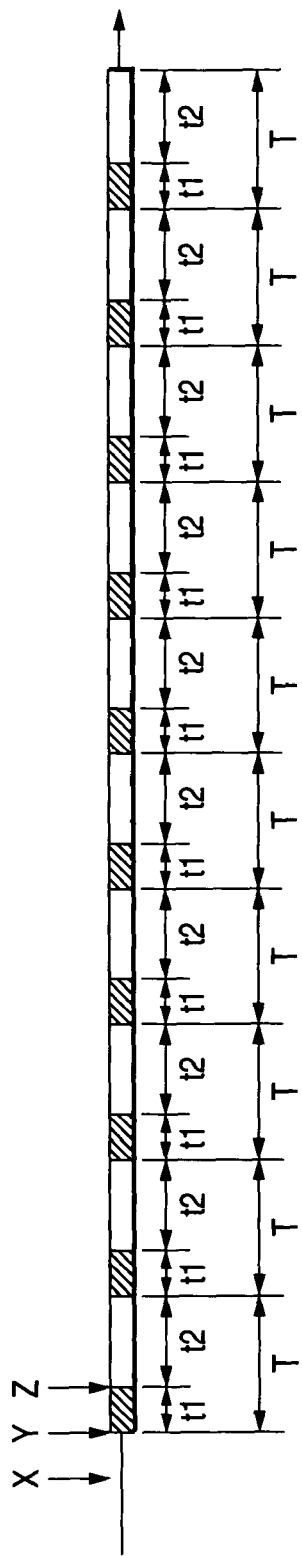
FIG. 3A
FIG. 3B

OPTICAL DISK REPRODUCING DEVICE HAVING AN INTERMITTENT REPRODUCING UNIT

BACKGROUND OF THE INVENTION

1. Field of the Invention

The present invention relates to an optical disk device that reads and reproduces data from an optical disk, such as a DVD or a CD, loaded into a main body.

2. Description of the Related Art

Conventionally, optical disk devices that read video and audio data from optical disks, such as DVDs and CDs, are in widespread use. Provided for a conventional, common optical disk device, is an intermittent reproducing function that intermittently reproduces, at specific time intervals, each predetermined amount of data recorded on an optical disk that is loaded into the main body. As is described in JP-A-6-309798, JP-A-2000-229864 and JP-A-2000-285589, the intermittent reproduction types are fast forward reproducing devices that reproduce, in the forward direction (time axial direction), data that are read from an optical disk and employ fast reverse reproduction to reproduce data in the reverse direction. A user employs the intermittent reproducing function to search a currently playing optical disk for a position whereat a desired picture or sound is recorded. Specifically, the user performs the intermittent reproduction and confirms pictures and sounds that are played, halts the intermittent reproduction when a desired picture or sound is played, and changes the operating mode to the normal reproduction mode. By using the intermittent reproducing function, the user can easily play the optical disk beginning at the position whereat desired data (video or audio data) are recorded.

However, during the intermittent reproducing process, the position whereat a picture or sound desired by a user is recorded will be skipped and the picture or the sound will not be played. Then, since the user can not confirm the position whereat the desired picture or sound is recorded, he or she must repeat the intermittent reproducing process to search for this position. Even during the second intermittent reproducing process, data substantially at the same position may be reproduced, and data substantially at the same position may be skipped, so that the desired picture or sound is still not played. In this case, the user must repeat the intermittent reproduction a number of times until he or she confirms the position whereat the desired picture or sound is recorded. In other words, since the problem arising because the intermittent reproduction is repetitively required is not taken into account for the conventional optical disk device, a wasteful repetitive intermittent reproducing process is be required to be performed by a user, and the usability is not superior.

SUMMARY OF THE INVENTION

The present invention provides an optical disk device that, when intermittent reproduction is restarted, reproduces data that were skipped and not reproduced during the preceding intermittent reproducing process, so that the wasted repetition by a user of the intermittent reproduction is avoided and the usability is improved.

To achieve this objective, an optical disk device according to the present invention has the following configuration.

According to an aspect of the present invention, an optical disk device includes an intermittent reproducing unit to perform an intermittent reproducing process to reproduce data recorded on an optical disk loaded into a main body in a forward direction or a reverse direction and at specific time intervals, each removing predetermined amount of data, an intermittent reproduction start instruction unit, upon receiving an instruction to start the intermittent reproducing process, to designate an intermittent reproduction start position and an intermittent reproducing direction for the intermittent reproducing unit, and to issue an instruction to the intermittent reproducing unit to start the intermittent reproducing process, and a storage unit, when the intermittent reproduction start instruction unit issues the instruction to the intermittent reproducing unit to start the intermittent reproducing process, to store, as information concerning a recording position for data that are to be skipped and not to be reproduced during a current intermittent reproducing process, the intermittent reproduction start position that is included in the instruction. Preferably, when an instruction is received to restart the intermittent reproducing process, the intermittent reproduction start instruction unit employs the information stored in the storage unit to instruct to the intermittent reproducing unit to start the intermittent reproducing process beginning at a head of data that were skipped and not reproduced during a preceding intermittent reproducing process.

According to this arrangement, the intermittent reproducing unit performs the intermittent reproducing process during which a predetermined amount of data on an optical disk, such as a CD or a DVD, are reproduced intermittently at specific time intervals. The intermittent reproduction types are a fast forward reproduction for reproducing, in the forward direction (time axial direction) data read from the optical disk, and a fast reverse reproduction for reproducing data in the reverse direction. When an instruction is entered to start the intermittent reproduction, the intermittent reproduction start instruction unit transmits an instruction to the intermittent reproducing unit to start the intermittent reproduction, and upon receiving this instruction, the intermittent reproducing unit starts the intermittent reproduction.

The information concerning the recording position of data that are to be skipped and not reproduced during a current intermittent reproducing process is stored in the storage unit. As is described above, during the intermittent reproducing process, a predetermined amount of data on the optical disk are intermittently reproduced at specific time intervals. Therefore, the head of data that are to be skipped and not reproduced during the current intermittent reproduction need only be stored as information concerning the recording position of such data. When an instruction is entered to restart the intermittent reproduction, the intermittent reproduction start instruction unit employs the information stored in the storage unit to instruct the performance of an intermittent reproduction beginning at the recording position for the data that were skipped during the preceding intermittent reproducing process, e.g., beginning at the head of the data that were skipped during the preceding intermittent reproducing process. Therefore, the intermittent reproduction is restarted, and a wasteful process, such as the reproduction of data substantially at the same position as previously read data and the skipping of data at substantially the same position as the previous data, can be avoided, and the usability can be improved.

The intermittent reproducing unit intermittently reproduces data recorded on the optical disk in a forward direction, or in a reverse direction, and the intermittent reproduction start instruction unit transmits an intermittent reproducing direction instruction to the intermittent reproducing unit, in addition to an instruction to start the intermittent reproducing process.

According to this arrangement, the fast forward reproducing process for intermittently reproducing data recorded on the optical disk in the forward direction (time axial direction), or the fast reverse reproducing process for intermittently reproducing data in the reverse direction can be selectively performed.

According to this invention, when the intermittent reproducing process is restarted, the data that were skipped during the preceding intermittent reproducing process are reproduced. Therefore, the wasteful repetition of intermittent reproduction can be avoided by a user, and the usability can be improved.

BRIEF DESCRIPTION OF THE DRAWINGS

FIGS. 3A and 3B are diagrams for explaining the intermittent reproducing operation of the optical disk device according to the embodiment.

DETAILED DESCRIPTION OF THE INVENTION

An optical disk device will now be described according to the preferred embodiment of the present invention.

Figure 1:
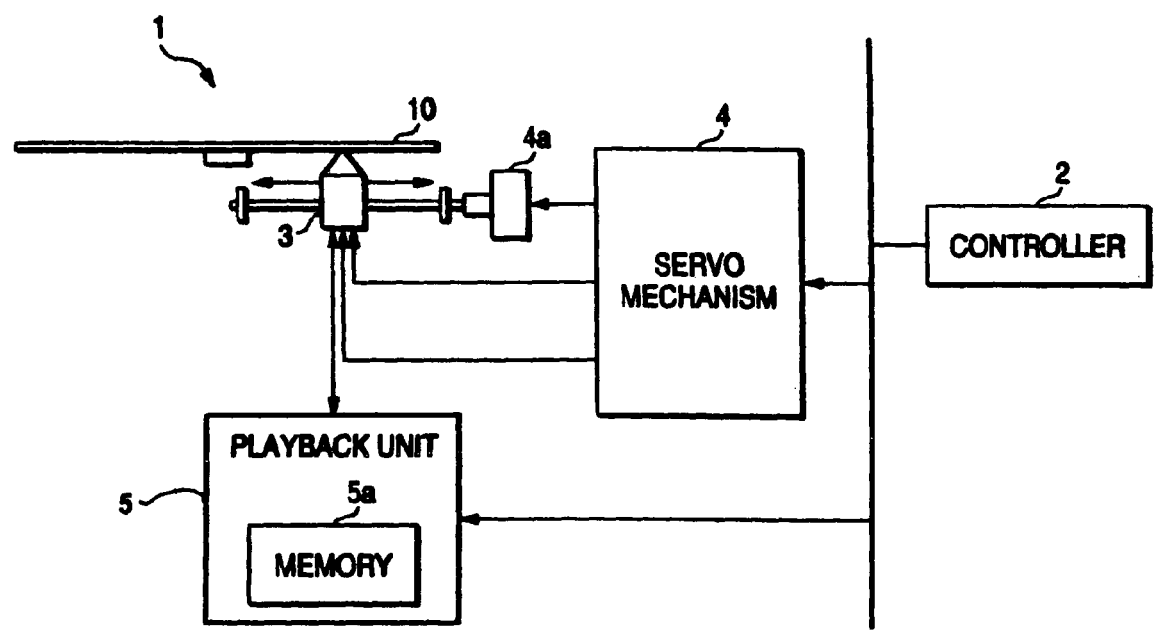
FIG. 1 is a block diagram showing the configuration of the essential section of an optical disk device according to one embodiment of the present invention.

FIG. 1 is a block diagram showing the configuration of the essential portion of an optical disk device 1 according to the embodiment. The optical disk device 1 for this embodiment includes a controller 2, which controls the operation of the entire optical disk device 1, a pickup head 3, which emits a laser beam to irradiate an optical disk 10, such as a CD or a DVD, loaded into the main body, and detects reflected light to read data recorded on the optical disk 10, a servo mechanism 4, which adjusts the irradiation position of the laser beam emitted by the pickup head 3, and a reproducing unit 5, which reproduces the data read by the pickup head 3. The pickup head 3 is fitted around a shaft that is extended in the radial direction of the optical disk 10 loaded into the main body, and a feeding mechanism (not shown) provided for the servo mechanism 4 drives a sled motor 4a to move the pickup head 3 along this shaft in the radial direction of the optical disk 10. A double-shaft actuator (not shown) is provided for the pickup head 3 to move a lens in a direction near or away from the optical disk 10, i.e., in the radial direction of the optical disk 10. Further, although not shown, a light-emitting device, which emits a laser beam to radiate the optical disk 10, and a light-receiving device, which receives light reflected by the optical disk 10, are also provided for the pickup head 3.

The servo mechanism 4 includes a focus servo mechanism (not shown), which performs a focus servo control process, based on a well known focus error signal (an FE signal), to move the lens provided for the pickup head 3 in the direction that is near or away from the optical disk 10, and to converge, at the recording face of the optical disk 10, the laser beam emitted by the light-emitting device of the pickup head 3, and a tracking servo mechanism (not shown), which performs a tracking control process, based on a well known tracking error signal (a TE signal), to move the lens in the radial direction of the optical disk 10, and to irradiate a target track using the laser beam that is emitted by the light-emitting device of the pickup head 3. The travel distances for the lens moved by the focus servo mechanism and the tracking servo mechanism are several hundreds of μm. When the distance the lens is moved by the tracking servo mechanism does not satisfactorily irradiate a target track with the laser beam that is emitted by the light-emitting device of the pickup head 3, the feeding mechanism moves the pickup head 3 in the radial direction of the optical disk 10. The tracking control process is performed both by the movement of the pickup head 3 by the feeding mechanism and the movement of the lens by the tracking servo mechanism.

A memory 5a, in which data read from the optical disk 10 are temporarily stored, is provided for the reproducing unit 5, and is used as a buffer for storing data that are read in advance from the optical disk 10. The reproducing unit 5 extracts data in the order in which the data were stored in the memory 5a, and converts the data into reproduction signals and outputs these signals. Since the optical disk device 1 includes the memory 5a, the reading of data from the optical disk 10 and the output of reproduction signals can be performed asynchronously.

In the optical disk device 1 of this embodiment, as well as in a conventional and well known device, for the reproduction of data from the optical disk 10, the focus servo mechanism performs the focus control process based on the FE signal, and the feeding mechanism and the tracking servo mechanism perform the tracking control process based on the TE signal, so that data are read from the optical disk 10 and are stored in the memory 5a. The reproducing unit 5 extracts the data from the memory 5a in the order in which the data were stored, and outputs reproduction signals obtained by processing the extracted data. Since the reproducing operation is well known, an explanation for this will not be given.

Figure 2:
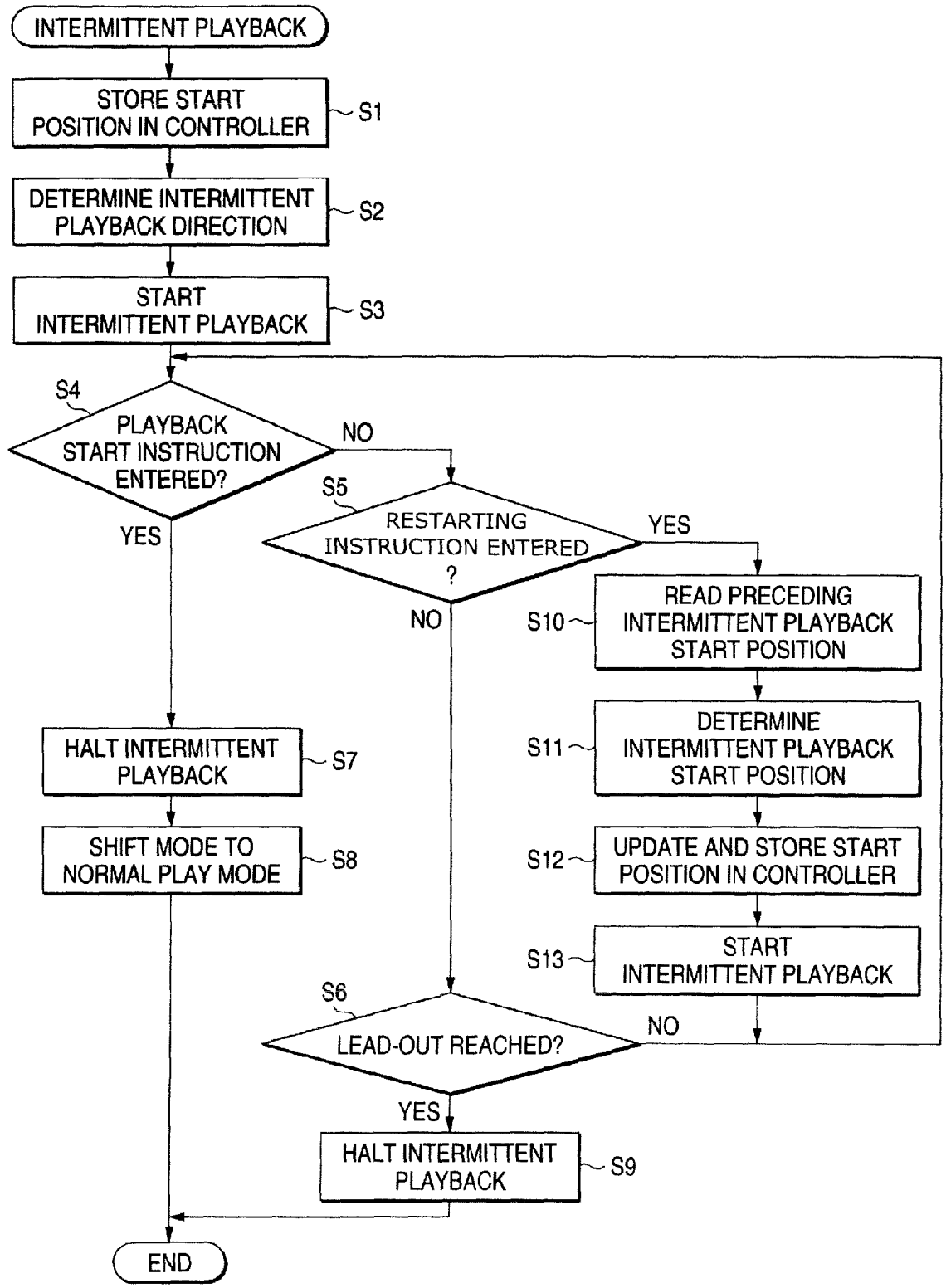
FIG. 2 is a flowchart showing the intermittent reproducing operation of the optical disk device according to the embodiment.

An explanation will now be given for the intermittent reproducing process performed by the optical disk device 1 of this embodiment. FIG. 2 is a flowchart showing the intermittent reproducing operation of the optical disk device 1 for this embodiment. The optical disk device 1 initiates the processing in FIG. 2 when, during reproduction, an instruction is entered at the main body to start the intermittent reproduction. When a fast forward play key or a fast reverse play key, provided for the main body, is manipulated, or when a control command is received from a remote controller instructing the start of the fast forward reproduction or the fast reverse reproduction, the optical disk device 1 determines that the instruction for the intermittent reproduction start has been entered. When this instruction is entered, the optical disk device 1 stores the current reproduction position on the optical disk 10 as a intermittent reproduction start position in the memory that is included in the controller 2 (s1). This memory corresponds to the storage unit for this invention. Further, the optical disk device 1 determines whether the intermittent reproduction requested by the current instruction is fast forward reproduction or fast reverse reproduction, and decides on a direction for the intermittent reproduction (s2).

The optical disk device 1 instructs the individual sections to start the intermittent reproduction, in the direction decided on at s2, at the intermittent reproduction start position determined at s1 (s3). Then, the intermittent playing is started. During the intermittent reproducing process initiated at s3, each predetermined amount of data recorded on the optical disk 10 is intermittently reproduced at specific time intervals. Specifically, as is shown in FIG. 3A, when the intermittent reproduction start position is defined as X, only head data t1 are reproduced every specific time T, and the remaining data t2 are skipped and not reproduced. In FIG. 3A, the hatched portions represent areas to be reproduced, while the other portions represent areas not to be reproduced. As a result, the (T/t1)-speed intermittent reproduction (fast forward reproduction or fast reverse reproduction) is performed. During the intermittent reproducing process, data that are not to be skipped and are to be reproduced are read from the optical disk 10, and data that are to be skipped are not read.

The optical disk device 1 continues the intermittent reproducing process initiated at s3 until a reproduction start instruction or an instruction for the restarting of the intermittent reproduction is entered at the main body or the data reading position reaches the lead-out area of the optical disk 10 (s4 to s6).

A user checks pictures reproduced from the optical disk 10 for which the intermittent reproduction is currently being performed, and when a desired picture is played, manipulates an operating console or the play key of a remote controller to issue a reproduction start instruction to the main body. When the optical disk device 1 determines at s4 that a play start instruction has been received by the main body, the optical disk device 1 halts the intermittent reproducing process (s7) and switches the operating mode to the normal play mode (s8). Then, the optical disk device 1 performs the normal play processing beginning at the position whereat the intermittent reproduction was halted.

In this manner, through the intermittent reproduction, the user can easily identify the recording position of a desired picture or sound, and can play the optical disk 10 beginning at the recording position.

Further, when the data reading position reaches the lead-out area of the optical disk 10 at s6, the optical disk device 1 halts the intermittent reproducing operation (s9) and terminates this processing. At this time, normal playing is not performed.

When the user can not find a desired picture among the pictures played back from the optical disk 10 for which the intermittent reproducing process is currently being performed, the user manipulates the operating console of the main body, or a restart key provided for the remote controller, and enters an instruction to restart the intermittent reproduction. The most common reason that a picture desired by a user can not be obtained from among the pictures played back from the optical disk 10 for which the intermittent reproduction is currently being performed is that the desired picture has been skipped and not played. Therefore, when an instruction is entered to restart the intermittent reproduction, the optical disk device 1 reads the preceding intermittent reproduction start position that is stored at s1 (s10), and determines, as a next intermittent reproduction (restarted intermittent reproduction) start position, the recording position, shifted from the preceding start position by time t1, i.e., position Y in FIG. 3B (s11). As a result, the head of the data that were skipped and not reproduced during the preceding intermittent reproducing process is determined to be the start position. The optical disk device 1 updates the intermittent reproduction start position stored in the memory of the controller 2 to the start position decided on at s11 (s12), and issues an instruction to start the intermittent reproduction at this start position in the direction determined at s2 (s13). Program control is returned to s4.

During the restarted intermittent reproducing process, as is shown in FIG. 3B, data in the recording area that were skipped and not reproduced during the preceding intermittent reproducing process are reproduced. In FIG. 3B, the hatched portions represent areas that are to be reproduced, and the other portions are areas that are not to be reproduced. Therefore, when the intermittent reproduction is again performed, the useless process during which data substantially at the same position as the previous data are reproduced and data substantially at the same position are skipped is not restarted. As a result, when the user restarts the intermittent reproduction, a picture or sound the user desires is played and is not skipped. Therefore, even when the user is not very sure of the recording position of a desired picture or sound, the optical disk 10 can be played beginning at the position whereat the desired picture or sound is recorded, and the usability can be improved.

It should be noted that when an instruction is again entered for the restarting of the intermittent reproducing process, the intermittent reproduction is initiated at a position Z shown in FIG. 3B.

What is claimed is:

1. A method of reproducing data recorded on an optical disk loaded in an optical disk device, the method comprising:

inputting a start instruction at a first time point during reproducing the data recorded on the optical disk;

starting an intermittent reproduction in which data reproduction for a first fixed time period and data skipping for a second fixed time period are alternately performed and repeated, from a first data position on the optical disk corresponding to the first time point;

storing information concerning the first time point;

inputting a restart instruction during performing the intermittent reproduction;

determining a second time point which is different from the first time point with reference to the information when the restart instruction is input; and starting the intermittent reproduction again from a second data position on the optical disk corresponding to the second time point, wherein:

the second time point is located within the second fixed time period; and the second time point is shifted from the first time point by the first fixed time period.

2. An apparatus operable to reproduce data recorded on an optical disk which is loaded therein, the apparatus comprising:

an intermittent reproducer, configured to perform an intermittent reproduction in which data reproduction for a first fixed time period and data skipping for a second fixed time period are alternately performed and repeated;

a controller, configured to cause the intermittent reproducer to start the intermittent reproduction in response to a start instruction and a restart instruction; and a storage, wherein:

when the start instruction is input at a first time point during the apparatus reproducing the data recorded on the optical disk, the controller causes the intermittent reproducer to start the intermittent reproduction from a first data position on the optical disk corresponding to the first time point;

the storage stores information concerning the first time point;

when the restart instruction is input during the intermittent reproducer performing the intermittent reproduction, the controller determines a second time point which is different from the first time point with reference to the information; and the controller causes the intermittent reproducer to start the intermittent reproduction again from a second data position on the optical disk corresponding to the second time point, wherein:

the second time point is located within the second fixed time period; and the second time point is shifted from the first time point by the first fixed time period.

* * * * *